UNITED STATES PATENT OFFICE.

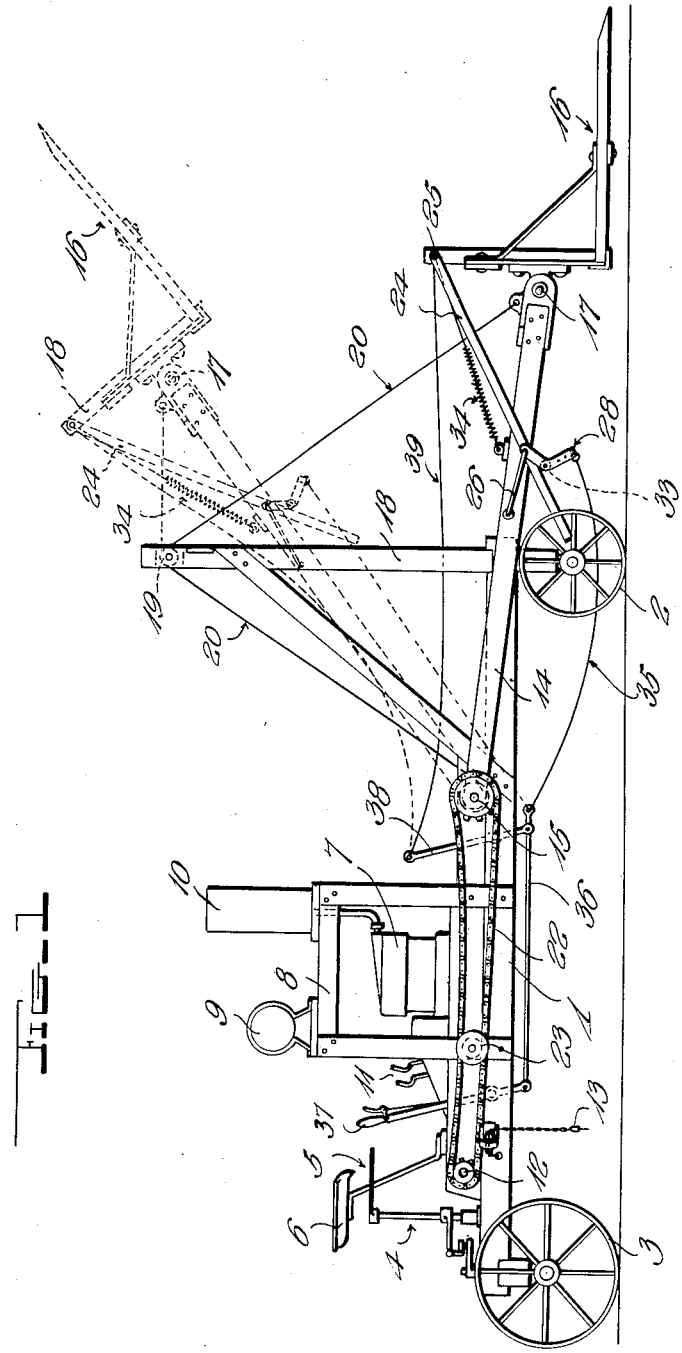

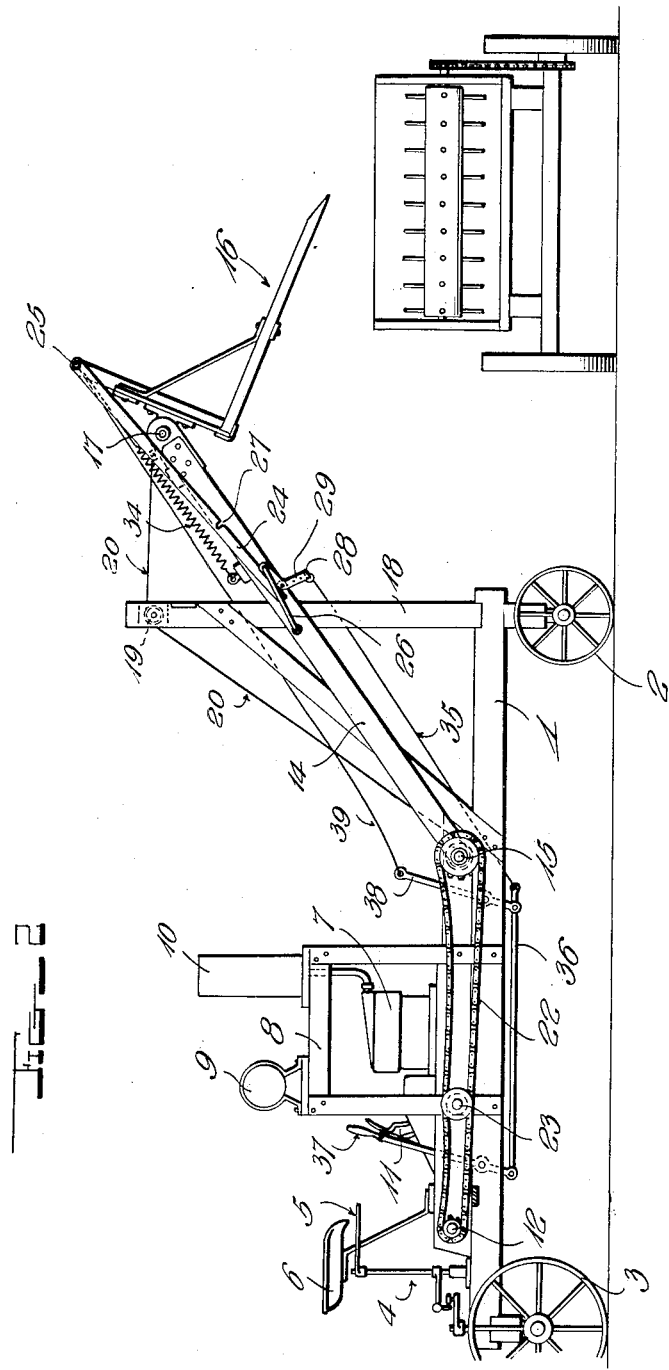

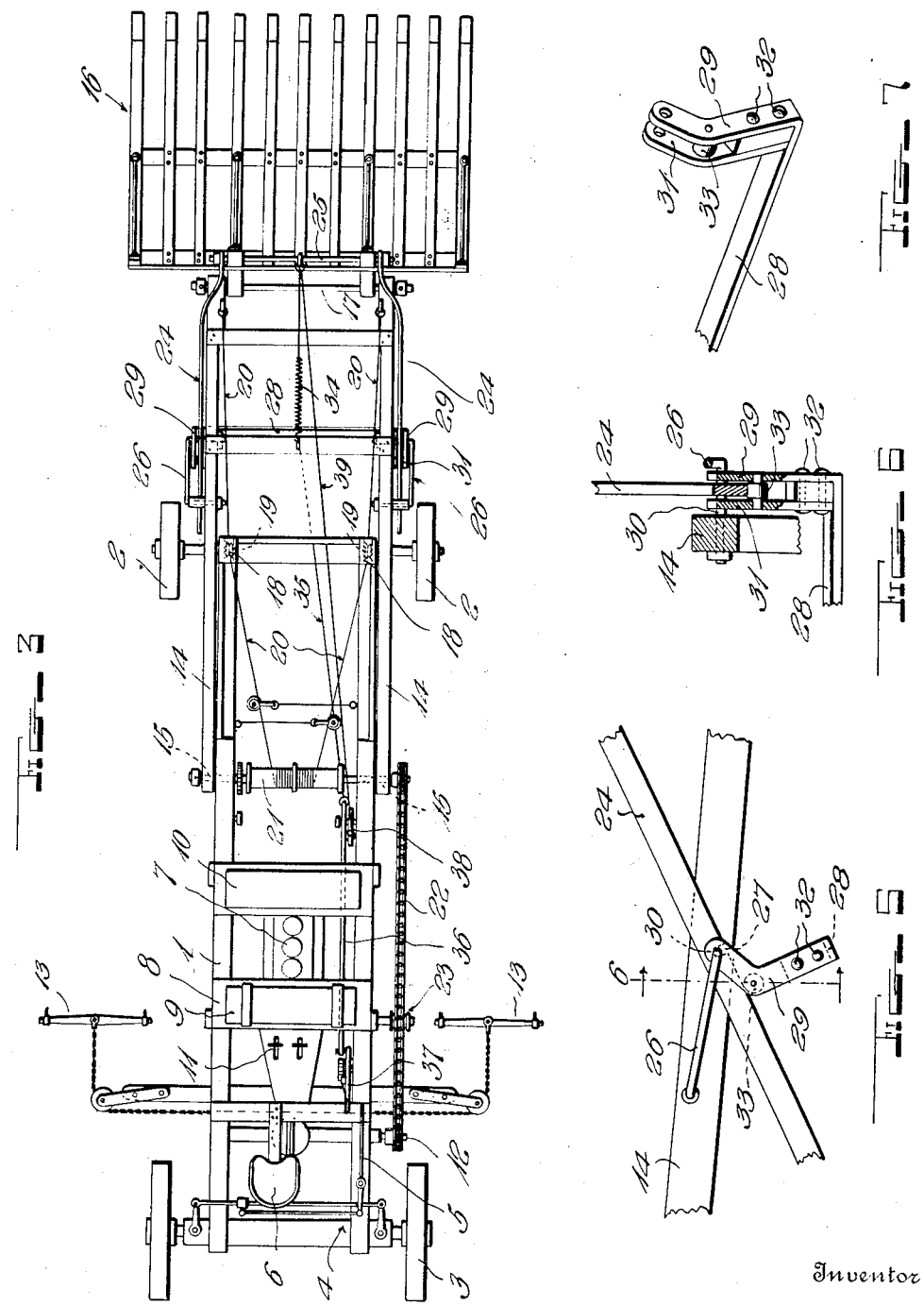

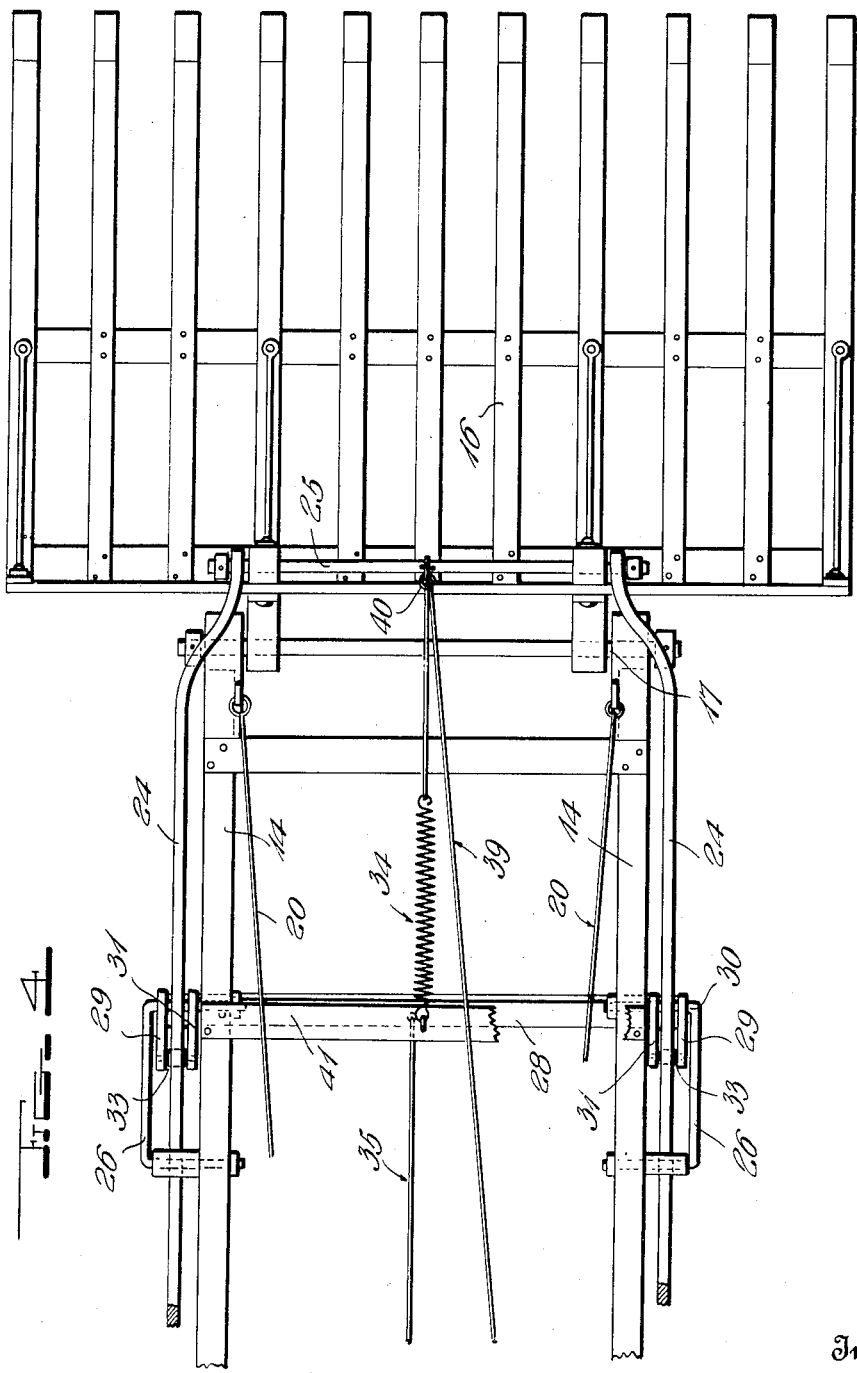

HERBERT F. LESSMANN, OF WAYNE, NEBRASKA.

LOADING-MACHINE.

1,337,082.

Specification of Letters Patent. Patented Apr. 13, 1920.

Application filed April 14, 1919. Serial No. 289,775.

*To all whom it may concern:*

Be it known that I, HERBERT F. LESSMANN, citizen of the United States, residing at Wayne, in the county of Wayne and State of Nebraska, have invented certain new and useful Improvements in Loading-Machines; and I do declare the following to be a full, clear, and exact description of the invention, such as will enable others skilled in the art to which it appertains to make and use the same.

My invention has for its object to provide a comparatively simple and inexpensive, yet a highly efficient and in every way desirable motor driven machine for raising material from the ground and dumping it into wagons or spreaders, the device being particularly well adapted for use upon farms for loading manure spreaders.

With the foregoing in view, the invention resides in the novel features of construction and unique association of parts hereinafter fully described and claimed, the descriptive matter being supplemented by the accompanying drawings.

Figure 1 is a side elevation of a loading machine constructed in accordance with my invention, showing the loading fork lowered in full lines and raised in dotted lines.

Fig. 2 is a view similar to Fig. 1 but illustrating the fork in dumping position.

Fig. 3 is a top plan view of the machine.

Fig. 4 is an enlarged plan view, showing more particularly the fork, the latch bars of said fork, and the releasing means for said latch bars.

Fig. 5 is an enlarged side elevation of one of the latch bars and its releasing means.

Fig. 6 is a detail vertical section on the plane indicated by the line 6—6 of Fig. 5.

Fig. 7 is a fragmentary perspective view showing part of the releasing means for the latch bars.

In the drawings above briefly described, the numeral 1 designates a horizontal frame of any suitable construction, mounted on front and rear wheels 2 and 3, and the rear wheels 3 may be steered by any adequate means 4 including a steering lever or the like 5 adjacent a seat 6 which is provided for the driver and operator of the machine. A gasolene engine 7 or other suitable prime mover is mounted on the frame 1, preferably beneath a stand 8 for the fuel tank 9 and radiator or water tank 10, and directly associated with the motor 7 is a suitable transmission gearing controlled by foot pedals 11 for driving a transverse shaft 12 either forwardly or rearwardly. From the shaft 12, power could well be taken for propelling the entire machine, but I preferably utilize the power from the motor only for operating the loading means, and provide swingletrees or the like 13 for hitching a team to the frame 1 for the purpose of moving the machine as required.

A pair of arms 14 are pivoted at their rear ends to the frame 1 as seen at 15, said arms extending forwardly from said frame and carrying a loading fork or the like 16 which may well be of substantially the same form as those commonly used on hay sweeps and stackers. However, the fork is by preference constructed of metal in order to withstand the strains to which it is subjected and is pivoted at 17 to the front ends of the arms 14, a transverse shaft being preferably provided for this purpose. Suitably braced posts 18 rise from the front end of the frame 1 and carry sheaves or pulleys 19 over which cables 20 pass for raising the arms 14, the front ends of said cables being secured to said arms while their rear ends are wound upon a windlass 21 which is driven by a sprocket chain or the like 22 from the shaft 12, it being of course understood that in addition to driving this shaft forwardly or rearwardly as above mentioned, the controls are such as to discontinue rotation of the shaft whenever required. It is thus evident that the arms 14 may be raised and lowered as required by winding or unwinding the cables 20 from the drum 21. If a chain such as 22 is employed in driving the drum, it will preferably pass around an idler 23.

For normally preventing pivotal movement of the fork 16, latch bars 24 are pivoted to said fork on a shaft or the like 25 located above the pivot 17, the rear ends of said bars 24 being slidably received in yokes 26 carried by the arms 14, the lower edges of the bars in question being provided with notches 27 or otherwise equipped with shoulders to engage the front ends of the yokes, thereby preventing pivotal movement of the fork 16 until said bars are raised. This raising could of course be effected in numerous ways, but I preferably pass a transverse release bar 28 under the arms 14 and bend the ends of said bar upwardly and then forwardly to provide angular levers 29 which are fulcrumed on the front ends 30 of the yokes 26. Short vertical bars 31 may be spaced from the levers 29 and secured thereto by rivets or the like 32, said levers and bars receiving the latch bars 24 therebetween as shown, and at the angles of said levers 29 and bars 31, rollers or the like 33 may be provided to strike and raise the latch bars 24 when the release bar 28 is moved rearwardly. When this takes place, the fork 16 is free to tilt downwardly to discharge the load. To absorb the shock when this tilting takes place, a coil spring 34 will in most instances be provided.

Any adequate means may be used for moving the release bar 28 rearwardly to disengage the notches 27 from the yokes 26, but for illustrative purposes I have shown a cable 35 leading rearwardly from said bar to a rod 36 which may be shifted forwardly and rearwardly by a hand lever 37 adjacent the driver's seat. By pushing the lever 37 forwardly, the cable 35 is operated to trip the release bar 28. This permits dumping of the fork 16 and in order that said fork may be returned to proper position for the next loading operation, I provide means for returning said fork when the lever 37 is pulled rearwardly. This means, as shown, consists of a lever 38 pivoted to and operated by the rod 36, a cable 39 leading forwardly from said lever, a cable guide 40 through which the cable 39 passes, and the coil spring 34 above described. The guide 40 is carried by the fork 16 at a point above the pivot 17 and is shown mounted on the shaft 25, and the spring 34 is attached at one end to the cable 39 and at its other end to a bar 41 which connects the arms 14. By this or an equivalent arrangement, after the fork has been released to dump the load by forward movement of the lever 37 (see Fig. 2) return movement of said lever will operate the lever 38 and pull upon the cable 39 to return the fork to its initial position, in which position it will be held by the latch bars 24.

In operation, the entire machine is pulled forwardly by the team or driven forwardly by power if suitable provision is made, so that the fork 16 which is then lowered as seen in full lines in Fig. 1, may be forced into the pile of material to be raised and dumped into a wagon or spreader. The proper pedal 11 is now operated to drive the windlass 21 in a direction to wind the cables 20 thereon, thereby raising the loaded fork to the position seen in dotted lines in Fig. 1. The machine is now moved to the wagon or spreader as seen in Fig. 2 and the lever 37 is pushed forwardly so that the levers 29 release the latch bars 24, thereby allowing the fork 16 to tilt downwardly and discharge the load. The sudden downward movement of the fork when the latch bars are released, is cushioned by the spring 34 and cable 39 and when the lever 37 is returned to its initial position, said cable is pulled in such manner as to return the fork to the dotted line position of Fig. 1, the latch bars 24 then engaging the yokes 26 to prevent further pivoting of the fork until they are released. The entire machine may now be returned to the pile of material and the fork lowered by driving the shaft 12 in such a direction as to payout the cables 20 from the windlass 21. The machine is now in condition for another operation such as that before described.

By the use of the machine, it is a simple matter to perform work on farms and elsewhere which has heretofore required a great deal of time and hard labor, and the work may be rapidly done. Excellent results have been obtained from the details disclosed and they may well be followed, but within the scope of the invention as claimed, numerous minor changes may well be made.

I claim:

1. A loading machine comprising a frame, a pair of arms pivoted to said frame for vertical swinging, means on said frame for swinging said arms upwardly, a fork pivoted to the front ends of said arms, a latch bar extending rearwardly from an off-center part of said fork and having a shoulder, a stop on one of said bars with which said shoulder coacts to normally prevent pivotal movement of said fork, a lever fulcrumed to the aforesaid arm in position to bear against and release said latch bar, and a cable leading from said lever for operating the same to dump the load.

2. A loading machine comprising a frame, a pair of arms pivoted to said frame for vertical swinging, means on said frame for swinging said arms upwardly, a fork pivoted to the front ends of said arms, a pair of latch bars pivoted to said fork above its pivot, lateral stops on said arms upon which said bars rest, said bars having shoulders to engage said stops and normally prevent pivotal movement of said fork, a transverse bar extending beneath said arms and having upturned ends pivoted thereto, said upturned bar ends having means to strike and release said latch bars when said transverse bar is moved on its pivots, and means for so moving said bar.

3. A loading machine comprising a frame, a pair of arms pivoted to said frame for vertical swinging, means on said frame for swinging said arms upwardly, a fork pivoted to the front ends of said arms, a pair of latch bars pivoted to said fork above its pivot, lateral stops on said arms upon which said bars rest, said bars having shoulders to engage said stops and normally prevent pivotal movement of said fork, a transverse bar extending beneath said arms and having upturned ends pivoted thereto, short vertical bars parallel with and secured to said upturned arm ends to form guides for said latch bars, means between said bar ends and short bars for striking and releasing said latch bars when said transverse bar is moved on its pivots, and means for so moving said bar.

4. In a loading machine, a portable frame, a vertically swinging frame member pivoted to said portable frame and extending forwardly therefrom, a fork pivotally carried by the front end of said frame member adapted to tilt to discharge its load, means for raising said frame member to elevate the load, means for holding said fork against tilting until raised to the required extent, a hand lever fulcrumed on said frame, a longitudinal rod connected with said hand lever for shifting thereby, a cable connecting said rod with the holding means of said fork to release the latter at will, a second lever fulcrumed on the frame and connected with said rod to be operated thereby, and a second cable connecting said second lever with said fork for returning the latter to load carrying position when said hand lever is properly shifted.

In testimony whereof I have hereunto set my hand.

HERBERT F. LESSMANN.